United States Patent Office 3,064,011
Patented Nov. 13, 1962

3,064,011
CYCLOPENTANOPHENANTHRENE DERIVATIVES
AND PROCESS
Lawrence H. Knox, Mexico City, Mexico, assignor, by mesne assignments, to Syntex Corporation, a corporation of Panama
No Drawing. Filed May 2, 1961, Ser. No. 107,040
6 Claims. (Cl. 260—345.2)

This invention relates to certain new cyclopentanophenanthrene derivatives and to a process for the production thereof.

More particularly, the invention relates to novel 13,17-seco-13,17-oxido-androstane derivatives.

The novel compounds of the present invention are illustrated by the following formula:

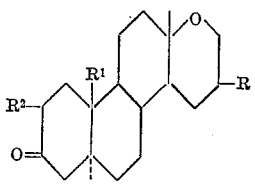

In the above formula, R, $R^1$ and $R^2$ represent hydrogen or methyl.

More specifically, among the new compounds corresponding to the above formula, there are 13,17-secoandrostan-3-one 13,17-oxide, 2α-methyl-13,17-secoandrostan-3-one-13,17-oxide, 16β-methyl-13,17-secoandrostan-3-one-13,17-oxide, 2α,16β-dimethyl-13,17-secoandrostan-3-one-13,17-oxide and 2α-methyl-13,17-seco-19-nor-androstan-3-one-13,17-oxide.

The new compounds illustrated by the above formula exhibit anti-estrogenic activity, anti-androgenic activity, inhibit the secretion of the pituitary gland and lower the blood cholesterol level, and are usable in a known manner for these purposes.

The process of the present invention may be exemplified by the following general equation:

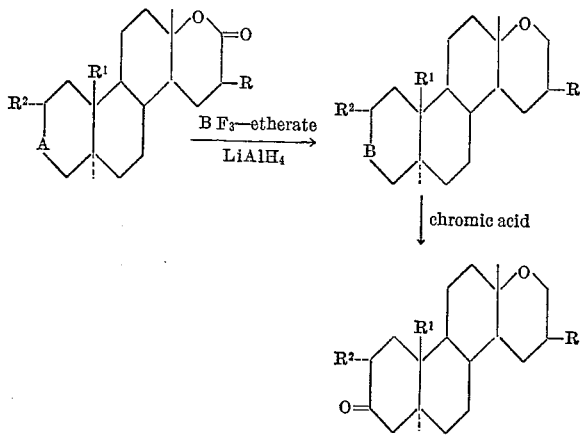

In the above equation R, $R^1$ and $R^2$ have the above explained meaning; A represents the carbonyl group

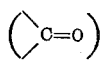

the β-hydroxymethylene group

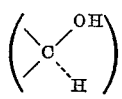

or the α-hydroxymethylene group

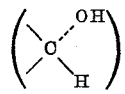

B represents the β-hydroxymethylene group

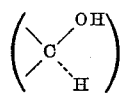

or the α-hydroxymethylene group

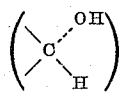

In practicing the process above outlined, the 13,17-seco-androstan-13α-ol-3-one-17-oic acid lactone or its 2α-methyl derivative and/or the 16β-methyl derivative thereof dissolved in boron trifluoride etherate is reacted with lithium aluminum hydride, preferably in suspension in an organic solvent inert to the hydride, such as diethyl-ether, with constant stirring and at low temperature as for example 0° C. After the period of one half hour to one hour the mixture is refluxed for a period of the order of 2 hours. After decomposition of the excess hydride, isolation of the product affords 13,17-secoandrostan-3β-ol-13,17-oxide or the 2α-methyl derivative and/or the 16β-methyl derivative thereof.

Upon oxidation preferably with an aqueous sulfuric acid solution of chromic acid, the 13,17-secoandrostan-3β-ol-13,17-oxide or the 2α-methyl derivative thereof dissolved in an organic solvent inert to oxidation such as acetone, yields the corresponding 3-ketones i.e. 13,17-secoandrostan-3β-ol-13,17-oxide or the 2α-methyl derivative and/or the 16β-methyl derivative thereof.

The following specific examples serve to illustrate but are not intended to limit the present invention:

*Example I*

A solution of 585 mg. of 13,17-secoandrostan-3β-ol-13,17-oxide in 50 cc. of acetone was treated successively with 1.0 g. of pulverized sodium sulfate and 1 cc. of an 8 N solution of chromic acid in aqueous sulfuric acid at 10° C. After stirring at the same temperature for 10 minutes, 1 cc. of propanol and 1 g. of sodium bicarbonate were added to decompose the excess oxidizing solution. The reaction mixture was filtered and the insoluble materials thoroughly extracted with methylene chloride. Evaporation of the solvent from acetone and methylene chloride fraction afforded a solid residue which was chromatographed on neutral alumina. The benzene eluates yielded 519 mg. of crude product with a melting point of 135–52° C. Several recrystallizations from n-heptane gave analytically pure 13,17-secoandrostan-3-one-13,17-oxide with a melting point of 156–7° C., $[\alpha]_D$ +22.2° ($CHCl_3$).

*Example II*

1 g. of 2α-methyl-13,17-secoandrostan-13α-ol-3-one-17-oic acid lactone (F. A. Kincl et al. patent application Serial No. 10,554 filed February 24, 1960) was dissolved in 12 cc. of boron trifluoride etherate, diluted with 75 cc. of ether and added with stirring and at 0° C. to a suspension of 1.2 g. of lithium aluminum hydride in 75 cc. of ether.

After 45 minutes at ice-bath temperature, followed by a 2 hour period at reflux, the excess reagent was decomposed by the cautious addition of ethyl acetate and subsequently water.

The organic layer was separated, dried over anhydrous sodium sulfate and evaporated to dryness under reduced pressure. Recrystallization from acetone-hexane yielded 2α-methyl-13,17-secoandrostan-3β-ol-13,17-oxide.

750 mg. of the foregoing compound were oxidized using exactly the same conditions described in Example I, thus furnishing 2α-methyl-13,17-secoandrostan-3-one-13,17-oxide.

*Example III*

1 g. of 16β-methyl-13,17-secoandrostan-13α-ol-3-one-17-oic acid lactone (H. J. Ringold et al., patent application Serial No. 38,765, filed June 27, 1960) was reduced following exactly the procedure described in Example II. Recrystallization from acetone-hexane yielded 16β-methyl-13,17-secoandrostan-3β-ol-13,17-oxide.

750 mg. of the above product were treated with 8 N chromic acid such as described in Example I affording 16β-methyl-13,17-secoandrostan-3-one-13,17-oxide.

*Example IV*

A solution of 1 g. of 2α, 16β-dimethyl-13,17-secoandrostan-13α-ol-3-one-17-oic acid lactone (H. J. Ringold, U.S. patent application Serial No. 38,765, filed June 27, 1960) in 12 cc. of boron trifluoride etherate was treated following exactly the technique described in Example II thus furnishing 2α,16β-dimethyl-13,17-secoandrostan-3β-ol-13,17-oxide.

Upon oxidation of the foregoing product such as described in Example I there was obtained 2α,16β-dimethyl-13,17-secoandrostan-3-one-13,17-oxide.

*Example V*

1 g. of 2α-methyl-13,17-seco-19-nor-androstan-13α-ol-3-one-17-oic acid lactone (2α-methyl-4,5-dihydroallo-19-nor-testololactone) (R. A. Kincl and H. J. Ringold, U.S. patent application Serial No. 13,426, filed March 8, 1960) was reduced following the procedure described in Example II thus yielding 2α-methyl-13,17-seco-19-nor-androstan-3β-ol-13,17-oxide.

This compound was treated by the technique described in Example I and afforded 2α-methyl-13,17-seco-19-nor-androstan-3-one-13,17-oxide.

I claim:

1. A compound of the following formula:

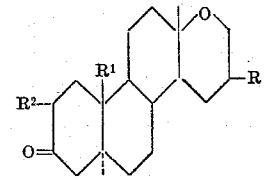

wherein R, $R^1$ and $R^2$ are selected from the group consisting of methyl and hydrogen.

2. 13,17-secoandrostan-3-one-13,17-oxide.
3. 2α - methyl - 13,17 - secoandrostan - 3 - one - 13,17-oxide.
4. 16β - methyl - 13,17 - secoandrostan - 3 - one - 13,17-oxide.
5. 2α,16β - dimethyl - 13,17 - secoandrostan - 3 - one-13,17-oxide.
6. 2α - methyl - 13,17 - seco - 19 - nor - androstan-3-one-13,17-oxide.

No references cited.